(12) United States Patent
Randall

(10) Patent No.: US 11,090,821 B2
(45) Date of Patent: Aug. 17, 2021

(54) CHOPPING AND SLICING KNIFE

(71) Applicant: David Awrey Randall, Marco Island, FL (US)

(72) Inventor: David Awrey Randall, Marco Island, FL (US)

(*) Notice: Subject to any disclaimer, the term of this patent is extended or adjusted under 35 U.S.C. 154(b) by 322 days.

(21) Appl. No.: 16/429,180

(22) Filed: Jun. 3, 2019

(65) Prior Publication Data

US 2020/0376692 A1 Dec. 3, 2020

(51) Int. Cl.
| | |
|---|---|
| *B26B 11/00* | (2006.01) |
| *B26B 9/00* | (2006.01) |
| *A47J 43/28* | (2006.01) |
| *A47J 42/34* | (2006.01) |
| *B26B 3/00* | (2006.01) |

(52) U.S. Cl.
CPC .............. *B26B 11/006* (2013.01); *A47J 42/34* (2013.01); *A47J 43/288* (2013.01); *B26B 3/00* (2013.01); *B26B 9/00* (2013.01)

(58) Field of Classification Search
CPC .......... B26B 11/006; B26B 11/00; B26B 3/00; B26B 9/00; A47J 42/34; A47J 43/288
See application file for complete search history.

(56) References Cited

U.S. PATENT DOCUMENTS

| 6,490,796 B1* | 12/2002 | Armienta | ............... A47J 43/284 |
| | | | 30/142 |
| 9,975,261 B2* | 5/2018 | Laub | .................... A47G 21/045 |
| 10,334,989 B2* | 7/2019 | Waymire | ........... G06Q 30/0623 |

* cited by examiner

*Primary Examiner* — David B. Thomas

(57) ABSTRACT

A cutlery device includes a blade with an attached handle. Two longitudinal edges of the rectangular blade include a sharpened edge and a non-sharpened spine on the opposite side. The blade has a rectangular fence extending substantially perpendicularly from one or both (opposite) sides of the spine, and extending to the distal end. In one form the fence curves around onto the distal end of the blade. A hole or aperture may be provided in the blade to allow transfer of prepared foods. The fence may be integral with the blade and spine, may be permanently secured to the blade, or may exist as a separate part that may be attached to and removed from the blade.

14 Claims, 5 Drawing Sheets

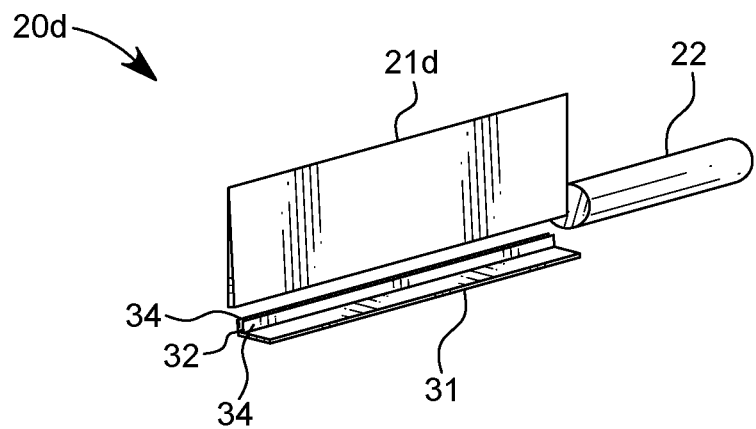
Figure 7
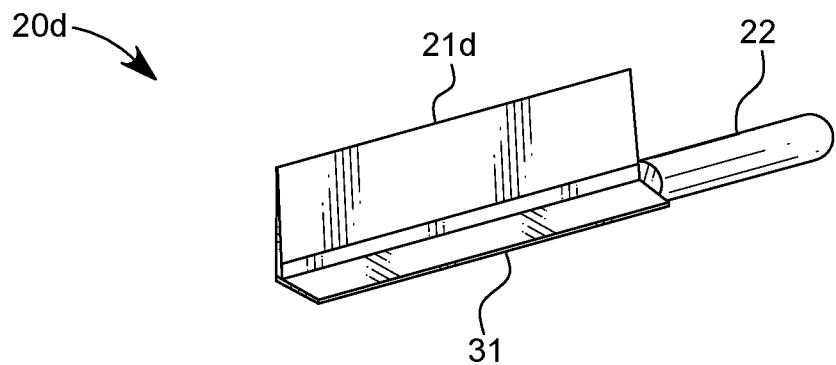
Figure 8
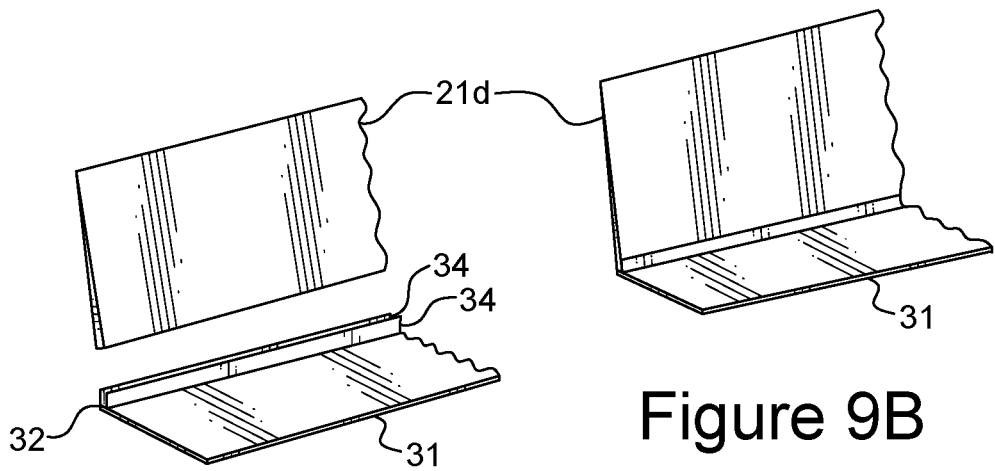
Figure 9A
Figure 9B

CHOPPING AND SLICING KNIFE

BACKGROUND OF THE INVENTION

This invention relates to food preparation, particularly to a chef's chopping, cutting and paring knife.

Food preparation is an activity of daily living, whether performed in a domestic or commercial setting. Even simple recipes require a plurality of ingredients. These constituent parts often require preparation such as slicing and chopping. Afterward, transfer to vessels such as bowls and jars becomes necessary for further cooking progress. Any chef will have experienced the difficulty and inconvenience in collecting these ingredients efficiently and moving them off the cutting surface without spillage, waste, or mess.

Food preparation often involves chopping, slicing, crushing, and other maneuvers to alter the form of various ingredients. To this end, a large number of cutlery devices have been designed for use with particular forms and sizes of food. These include cleavers, butcher knives, chef knives, paring knives, bread knives, plus many more specialized instruments. Some combine more than one cutting feature to reduce the number of implements that must be stored. This also may reduce the frequency with which the cook much change from one tool to another, thereby reducing fatigue and cooking effort. Others incorporate means for the chef to collect, scoop, or pick ingredients up for transfer to another vessel.

Knives with Different Cutting Features

Many designs incorporate more than one type of cutlery feature. Tongue U.S. Pat. No. 80,242 added a curved knife edge at the distal end of a cleaver to create a mincing function. Barden's knife (U.S. Pat. No. D28,186) had a straight slicing edge, a serrated cutting edge, and a point separating the two at the distal end. Donnelly U.S. Pat. No. 745,162 incorporated a cleaver-shaped extension along the spine of a chef's knife. Di Libero (U.S. Pat. No. 5,692,308) tapered the distal end of the knife's spine downward to meet the edge of a cleaver, included both serrated and straight-edge cutting features and sharpened both sides of the triangular tip. Treiber U.S. Pat. No. 2,814,870 describes a utensil that embodied the characteristics of a spatula, knife, and fork. Becher (U.S. Pat. No. D269,244) changed the sharpened edge of his chef's knife to be straight proximally and serrated distally. Steiner (U.S. Pat. No. D275,065) showed a device that incorporated a serrated edge longitudinally along one edge of an implement similar to a cake spatula. The Klever Kleever multi-purpose cleaver knife (Sandell Co., Wilmington, Del.) incorporated a curved knife edge, a serrated area, and a bottle opener.

Knives with Spatula or Food-Collecting Features

The knife blade of the Treiber and Steiner patents referenced above sought to combine spatula and cutting functions, but lacked any feature to deter spillage of cuttings off the spatula's surface. Gilbert's culinary tool (U.S. Pat. No. 2,234,242) featured a wide blade with serrated and straight sharp edges intended to be "capable of use in cutting, chopping, sawing, scraping, turning, and other operations," for food materials. The wide implement would serve well for purposes of cutting and functioning as a spatula. However, it lacks any feature that would deter spillage from its surface.

Related Culinary Device

Fender (U.S. Pat. No. 2,232,940) patented a potato peeler which limited the depth of the peeling cut and is a device familiar to most cooks. Pressman U.S. Pat. No. 4,630,367 describes another tool for performing cuts of controlled depth in orange rinds and the like for aiding in peeling. The knife blade has a fence that can be either an integral member joined to the knife by a bend or an adjustable side member. One longitudinal portion of the blade (on one side of the longitudinal peeling slot) is enlarged to form a knife blade. The other, oriented at an angle, is much narrower and forms an attached fence. Addition functions besides separating rinds from fruit or vegetables are to core, gouge, and otherwise cut produce. The knife is not configured to collect or transfer food cuttings. The Deli Pro Knife (as seen on TV Products, Clearwater, Fla.) and the Victorinox Precise Slicer (Victorinox, Ibach, Switzerland) add an adjustable cutting thickness guide to a kitchen knife.

The Pressman device describes a fence that serves as a depth-guide and in a wholly different fashion than this present invention. Fences providing this depth-guide function may also be found in other applications such as table saws, routers, and other devices that similarly control width or depth of cut. Fender's potato peeler operates in a similar manner to remove a vegetable skin, although lacks the additional cutting features described by Pressman. The Deli Pro Knife and the Victorinox Precise Slicer have adjustable cutting guides that function in a manner similar to that illustrated in Pressman's FIGS. 12-14. And although Pressman does describe a form of fence, review of his patent and its figures demonstrates its service and configuration as a depth-limiting guide, tapered in shape to a narrow distal end. The design of that blade would be poorly suited for the chopping, slicing, and food-conveyance functions described by this present invention.

Many existing cutlery devices provide knife blade surfaces on which ingredients may be held in a manner similar to a spatula. However, any cook will understand the inherent spillage and difficulty conveying food into receptacles, particularly those with narrow receiving apertures.

SUMMARY OF THE INVENTION

This invention describes a knife or cutlery device that incorporates a fence or flange set longitudinally along its spine to contain cuttings or prepared ingredients and guide them to a receiving vessel.

Objects of the invention are to provide a utensil for slicing, chopping, crushing, and other preparation of food as well as a means to easily and reliably convey these ingredients to a recipient vessel. The present invention incorporates use of a substantially raised longitudinal fence attached to the blade at the spine as depicted in the figures below. This fence or flange provides the means for efficient food collection and transfer. Other objects include additional ingredient-preparation means that may be incorporated such as a cutting-edge extension. The knives of the prior art with spatula features described above can hold ingredients, although not reliably, on their flat surfaces. Similarly, a standard cleaver or any wide blade may serve this function. The advantage of the present design is prevention of spillage of food off the back or spine of the blade. The cook simply gathers the cut material distally along the trough created by the angle between the blade and fence. It can then fall or pour into a receiving container.

REFERENCE NUMBERS

20. Knife or cleaver.
21. Blade
22. Handle of cutlery device attached to blade.
23. Spine of blade.

24. Fence or flange attached to spine of blade at a substantially perpendicular angle.
26. Chopped ingredients being transferred off blade.
28. Extension of distal end of sharpened knife edge of a substantially triangular shape to function as a paring or coring knife.
30. Hole at distal end of blade through which food may be poured or transferred.
31. Separate fence or flange that extends outward from one side of blade spine at a substantially perpendicular angle.
32. Channel on detachable fence to receive knife spine.
33. Separate fence or flange that extends outward from both sides of blade spine at a substantially perpendicular angle.
34. Small flanges or other fastening means to attach detachable fence to blade spine.
35. Hinge or pivot securing swivel-mounted fence to blade.

DESCRIPTION OF THE DRAWINGS

FIG. 7 shows another embodiment, a knife similar to a standard cleaver as illustrated in FIG. 1 but including a fence as in FIG. 1 that may be attached to or removed from the spine of the knife or cleaver.

FIG. 8 shows the knife of FIG. 7 with the fence attached to the spine.

FIG. 9A is an enlarged, partial view of the blade of FIGS. 7-8 with the fence removed.

FIG. 9B is a similar enlarged view but with the fence attached to the spine.

DESCRIPTION OF EMBODIMENTS OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, a method, and apparatus to facilitate preparation (cutting, chopping, crushing) of foods surface with a design that allows transfer to virtually any dimensioned bowl or other receiving vessel, including those with narrow openings. Further, it seeks to accomplish this in an economic fashion with simplicity of design.

In one embodiment, the knife is produced from metal such as stainless or carbon steel. Alternative materials such as ceramics can be used. Essential qualities include resistance to harboring microorganisms, ability to maintain a sharp edge, breakage-resistance, and ability to easily clean. Size may be varied according to the intended food preparation. The knife incorporates a fence and optionally a perforation or opening to allow the cook to process and transfer ingredients easily.

Figure 1:
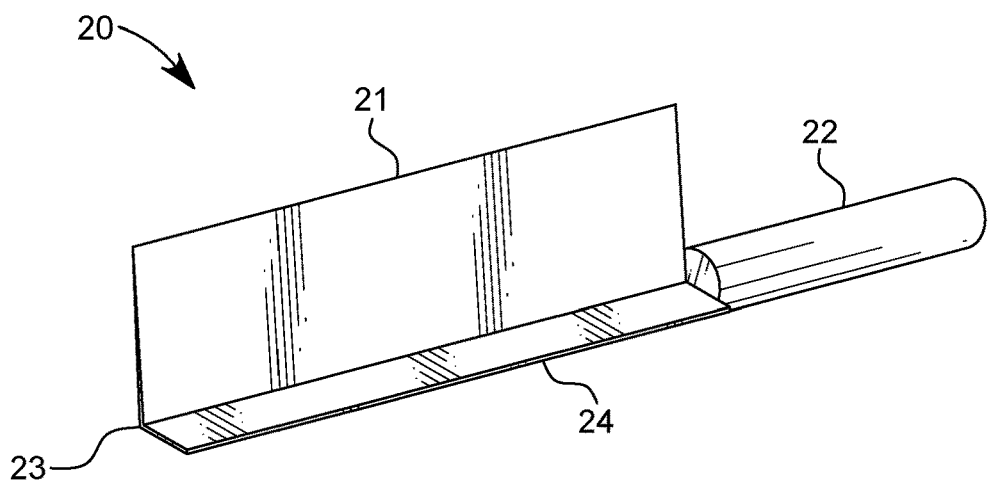
FIG. 1 is a perspective view showing a knife or cutlery device comprising a blade similar to a cleaver, a fence attached to the blade spine, and a handle attached to the blade tang.

In the drawings, FIG. 1 shows a chef's cutting knife 20 (sometimes called a cleaver herein) having a knife blade 21 with a proximal end attached to a handle 22. This can be via a tang, not shown, extending from the proximal end of the blade and secured to the handle, as by rivets or other means. The blade 21 has attached to it, at its spine 23, a fence or flange 24 that extends preferably at a substantially right angle to the plane of the blade 21. The angle could be between about 45° and 135° or more preferably between 80° and 100° in relation to the blade. Reference to a fence angle using the word substantially should be understood to mean plus or minus 5°. In a preferred embodiment the fence 24 is integrally formed with the blade 21.

Figure 2:
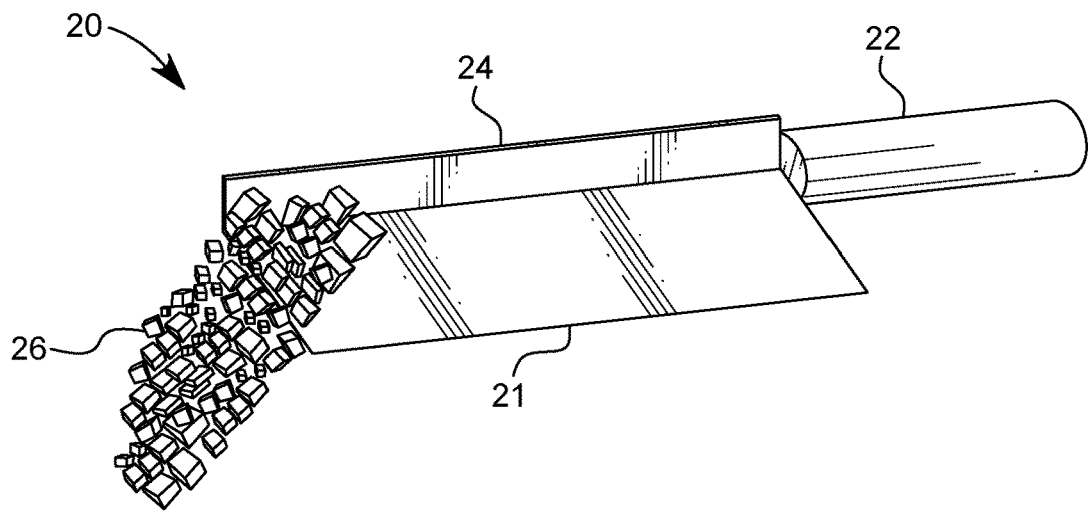
FIG. 2 is a perspective view showing chopped ingredients being poured or transferred off the distal end of knife illustrated in FIG. 1.

In FIG. 2 the knife of the invention is shown with chopped food pieces or ingredients 26, here being transferred off the distal end of the blade. The cut or chopped pieces 26 can be collected on the blade by scooping them up from a cutting board or surface, with the fence or flange 24 defining a limit to the movement of the cut pieces. The flange and the blade form a trough from which the food pieces can be poured or slid off the knife.

Figure 3:
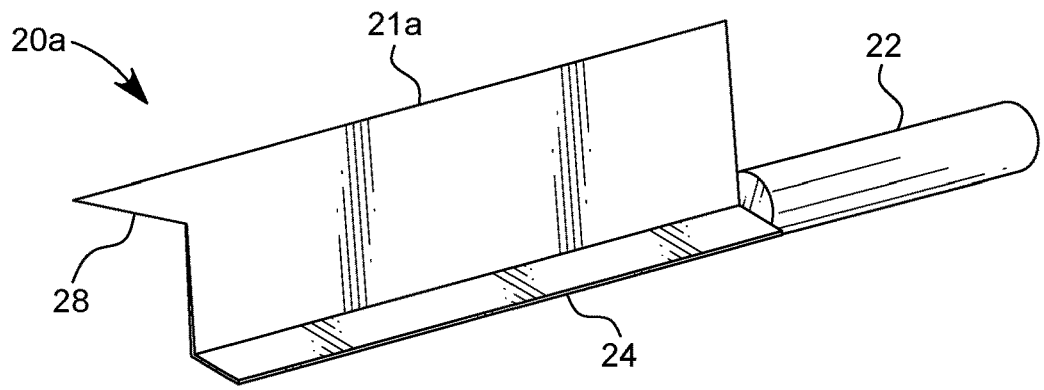
FIG. 3 is a similar view but illustrating a modified knife with a generally triangular extension of the sharp edge to function as a paring or coring knife.

In FIG. 3 the knife 20a has a substantially triangular distal extension 28 on the blade 21a, defining a point as shown. The extension is preferably integral with the knife blade, although it will typically be of a lesser thickness. The distal extension 28 can be used to function as a paring or coring knife.

Figure 4:
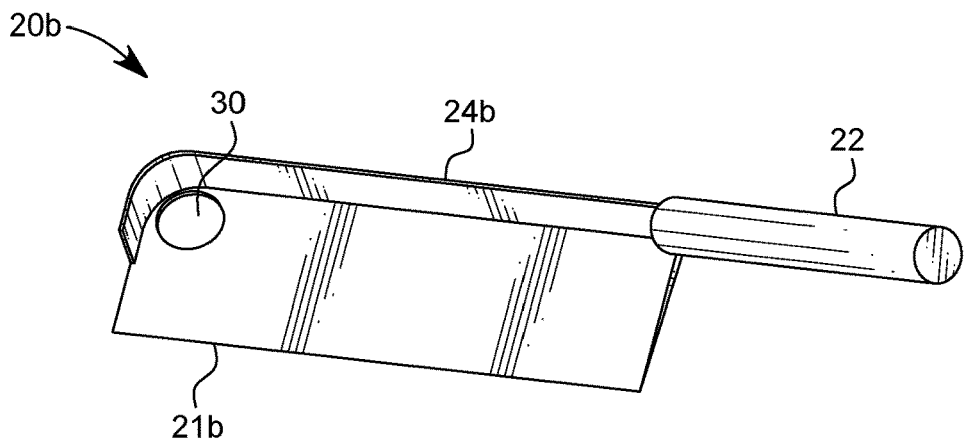
FIG. 4 is a perspective view with a modification of the knife illustrated in FIG. 1, including curvature of its fence, and with a hole in the blade through which ingredients may be transferred.
Figure 5:
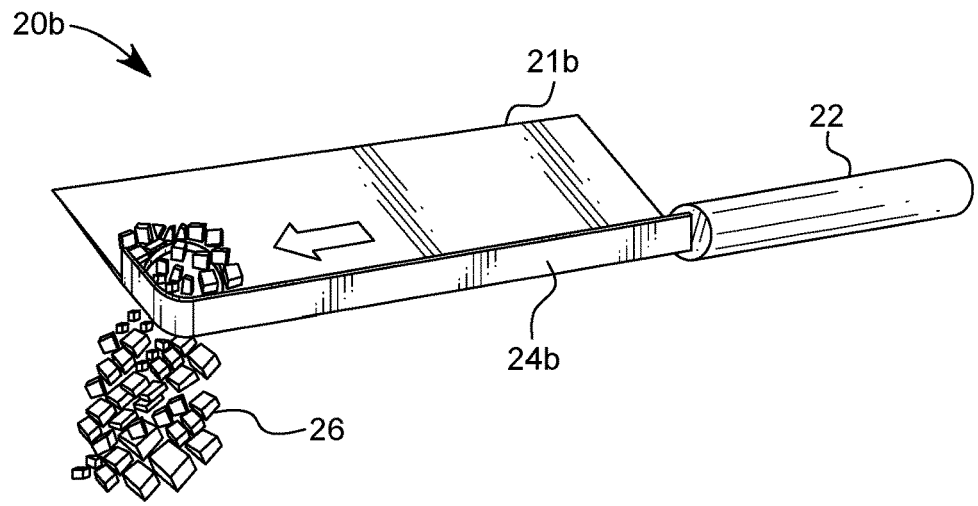
FIG. 5 is another perspective view demonstrating food being dropped or transferred through the hole of the knife illustrated in FIG. 4.

FIG. 4 shows another variation of the knife of FIG. 1. In FIG. 4 the knife 20b has a fence or flange 24b that wraps around the distal end of the knife's spine, preferably in a curve or partial-circular shape as shown. Cooperating with this curved fence is an adjacent hole 30 through the knife blade 21b. Again, the fence 24b can be integrally formed with the blade 21b, or it could be attached, as by welding or suitable low-profile fasteners. FIG. 5 shows the same knife 20b, with cut food pieces 26 which have been retained on the surface of the blade 21b, being swept through the hole 30 to drop into a bowl or vessel, which can be a container or bottle with a narrow opening.

Figure 6:
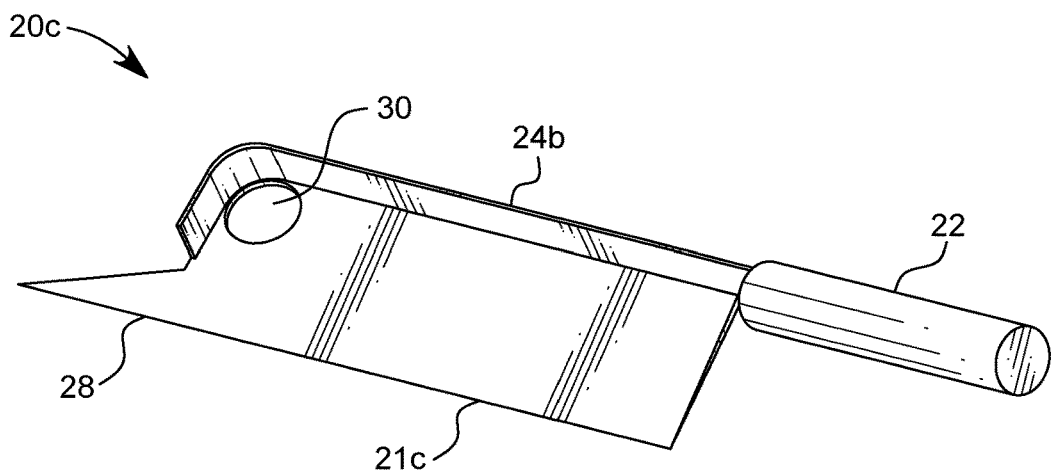
FIG. 6 shows a knife identical to that of FIG. 4 with the addition of a substantially triangular tab as in FIG. 3, to function as a paring or coring knife.

FIG. 6 shows the knife of FIG. 4, with the curved fence 24b and the food-transferring hole 30, but with the addition of a triangular pointed end 28 on the blade 21c, this distal end being similar to what is shown in FIG. 3, for use in paring or coring.

FIGS. 7, 8, 9A and 9B show another version of the knife of FIG. 1, in this case formed of two pieces secured together.

The knife or cleaver 20d has a blade 21d secured to the handle 22, with the spine 23 of the blade being securable into a channel or slot 32 of the separate fence 31, the slot being formed by a pair of longitudinal tabs or flanges 34 on the fence. In FIG. 8 the fence has been secured to the knife blade. Other means of removable connection can be used. Note that FIGS. 7 and 8 can be considered as illustrating a modular pair of components that can be secured together as desired, or as an illustration of one manner in which a fence 31 can be permanently secured to the knife blade. In the event the fence 31 is securable as desired by the user, the spine 23 of the blade and the shape of the slot or groove 32 can be "keyed" to a particular shape, such as a capturing taper or a more complicated gripping configuration whereby the blade's spine is slid through the length of the channel or groove 32 for assembly and is retained relatively rigidly. In the event the connection is permanent, the fence 31 can be secured to the spine of the blade 21d by welding or rivets, for example.

Figure 10:
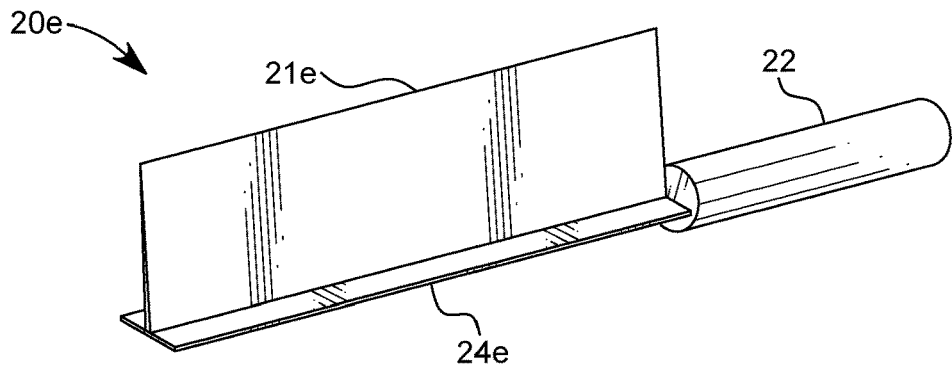
FIG. 10 is a view showing a knife similar to that of FIG. 1 but incorporating fences extending outward from opposite sides substantially perpendicular to the blade.
Figure 11:
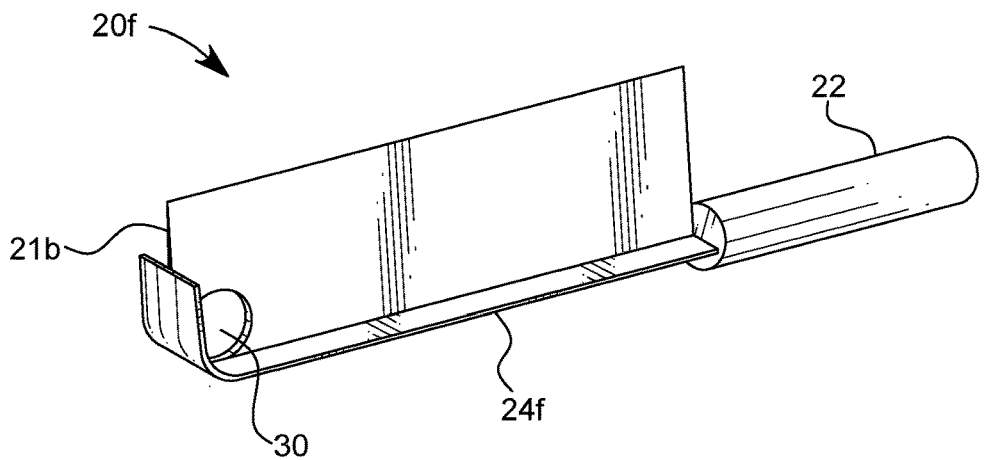
FIG. 11 shows a knife similar to that of FIG. 4 but with the curved fences extending outward from opposite sides at substantially perpendicular angles to the blade.
Figure 12:
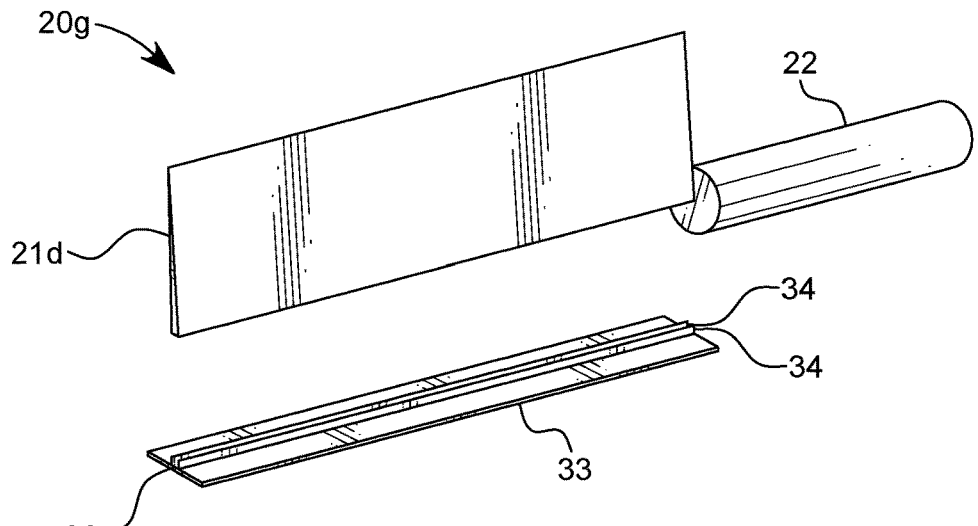
FIG. 12 shows a knife similar to that of FIG. 7 but with a detachable fence that extends outward from both opposed sides of the spine substantially perpendicular to the blade.

FIGS. 10 through 12 show further versions of a specialized knife of the invention. In each case the knife has a fence that extends from the knife blade's spine in both directions, forming a T-shape. In FIG. 10 the knife 20e is similar to the knife of FIGS. 1 and 2, but with a fence 24e attached to the spine and extending in both directions. The fence can be a planar component as shown.

The knife 20f of FIG. 11 is similar to the embodiment shown in FIGS. 4 and 5, but with a fence 24f extending both left and right from the spine of the knife, the fence otherwise being similar to the fence 24a shown in FIGS. 4 and 5. The fence 24f could be removable as in FIGS. 7-9B.

In FIG. 11 the double-sided fence 33 of the knife 20g is shown separate from but connectable to the knife blade 21d, which is of the same configuration shown in FIGS. 7 and 8.

Figure 13A:
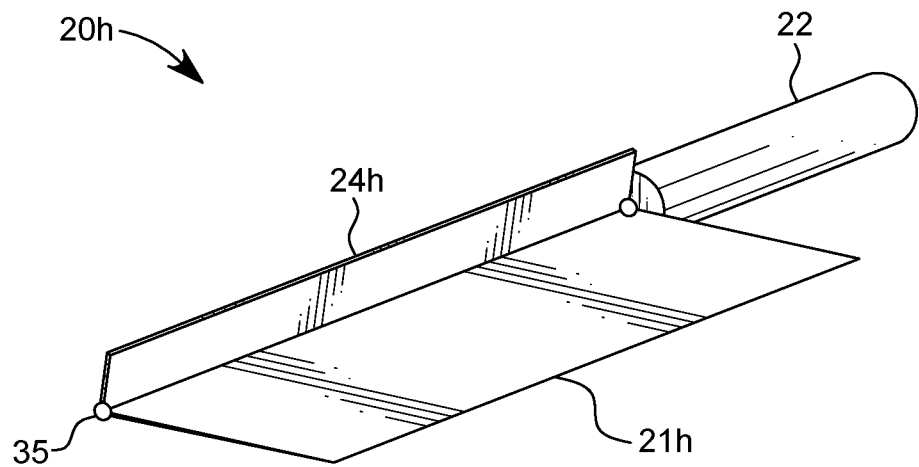
FIGS. 13A and 13B show a modification in which the fence or flange is pivotally connected to the blade.
Figure 13B:
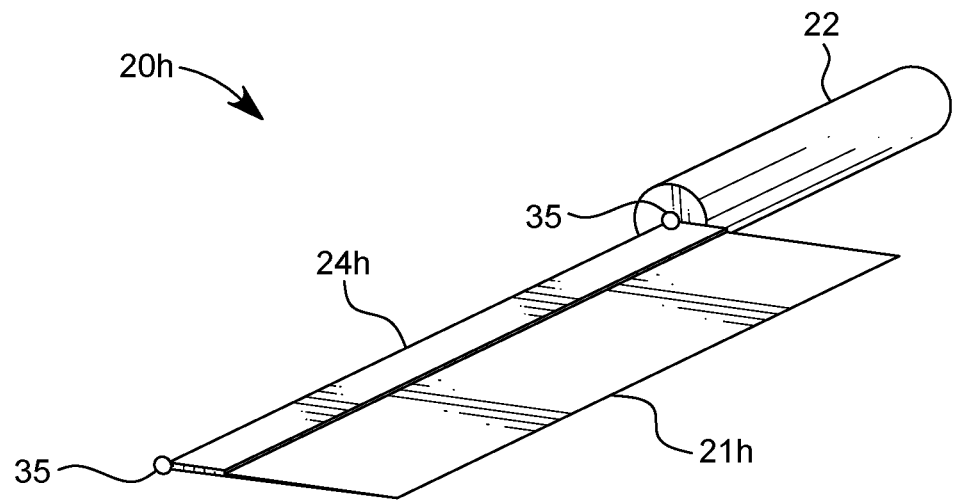

FIGS. 13A and 13B show another version of a knife or cleaver of the invention. The knife or cleaver 20h is similar to the knife of FIG. 1 but with a fence or flange 24h that is attached to the blade by a hinge mechanism 35 or other folding/pivoting means. This allows the fence to lie flat against the blade 21h, as shown in FIG. 13B. When deployed as in FIG. 13A, the fence is substantially perpendicular to the blade. Storage of the knife is made easier with the fence folded down.

The described embodiments of this invention allow the chef reliable means to prepare, collect, and transfer material with use of a single implement. Additional cutting features, such as the described cutting-edge extension, further reduce the need for the cook to change between utensils.

All embodiments may be manufactured by existing methods known to those skilled in the art.

Use of this Cutlery Device

1. The chef uses the sharp edge of the knife for slicing, chopping, and other preparation of food.
2. The side of the blade may be used to crush ingredients.
3. The fence may be used to crush, pound, or tenderize food when held with the sharp edge up.
4. Chopped or prepared ingredients can be transferred or poured from the flat surface of the blade.
5. The blade may be used to scoop cut pieces onto the blade prior to transferring them to a vessel or another area.
6. In some embodiments of the knife the cook can use the knife with or without the fence to improve convenience and flexibility in function.

The various embodiments of this invention provide solutions to difficulties with food preparation and transfer encountered with existing cutting boards.

It should be understood that the foregoing relates to exemplary embodiments of the invention and that modifications may be made without departing from the spirit and scope of the invention as set forth in the following claims.

I claim:

1. A knife for cutting, crushing, and other preparation of food while also being configured to scoop, collect, pour, or transfer food pieces prepared with the knife, comprising:
    a substantially rectangular blade having proximal and distal ends, with a handle secured to the proximal end,
    the blade being sharpened along one longitudinal edge,
    the blade having a non-sharpened spine opposite the sharpened longitudinal edge,
    an essentially rectangular flange attached to the blade at the spine and extending longitudinally along the spine, at an angle to the blade of 45° to 135°,
    whereby food pieces on the knife blade are prevented from sliding off the spine of the blade.

2. The knife of claim 1, wherein the angle of the flange with the knife blade is substantially a right angle.

3. The knife of claim 1, wherein the blade has a triangular extension at the distal end, the extension extending distally and having a sharpened edge as a continuation of the blade's sharpened edge, such that the extension can function as a paring knife.

4. The knife of claim 3, wherein the triangular extension has a thickness less than that of the blade.

5. The knife of claim 1, wherein the flange continues around a corner of the blade from between the spine and distal end of the blade to extend partially along the distal end of the blade, and including a hole in the blade adjacent to said corner to allow food pieces to drop through the hole into a collecting vessel.

6. The knife of claim 5, wherein said corner is rounded.

7. The knife of claim 5, wherein the flange extends in two opposed directions from the spine of the blade, essentially in a T configuration.

8. The knife of claim 1, wherein the flange is integrally formed with the blade as a single piece of metal.

9. The knife of claim 1, wherein the flange is removable from the blade, whereby the knife can be used with or without the flange.

10. The knife of claim 9, wherein the blade, at the spine, includes a channel extending substantially perpendicularly from the blade, configured to receive and retain the flange when inserted into the channel.

11. The knife of claim 9, wherein the flange extends in two opposed directions from the spine of the blade, essentially in a T configuration.

12. The knife of claim 11, wherein the flange includes a channel extending longitudinally along a surface of the flange, the channel being sized and configured to closely receive and retain the spine of the blade for assembly of the flange onto the blade.

13. The knife of claim 1, wherein the flange extends in two opposed directions from the spine of the blade, essentially in a T configuration.

14. The knife of claim 1, wherein the flange is pivotally secured to the blade such that in a deployed position the flange extends substantially at a right angle from the blade and in a stored position the flange lies flatly against the blade.

* * * * *